United States Patent
Sharp

(10) Patent No.: US 6,455,457 B1
(45) Date of Patent: Sep. 24, 2002

(54) SUPPORTED POLYMERIZATION CATALYST

(75) Inventor: Christopher Sharp, Staines (GB)

(73) Assignee: BP Chemicals Limited, London (GB)

(*) Notice: Subject to any disclaimer, the term of this patent is extended or adjusted under 35 U.S.C. 154(b) by 0 days.

(21) Appl. No.: 09/479,424

(22) Filed: Jan. 7, 2000

Related U.S. Application Data

(63) Continuation of application No. PCT/GB98/01961, filed on Jul. 3, 1998.

(30) Foreign Application Priority Data

Jul. 8, 1997 (GB) .............................................. 9714387
Jul. 8, 1997 (GB) .............................................. 9714388

(51) Int. Cl.$^7$ ............................................. B01J 29/035
(52) U.S. Cl. ........................ 502/63; 526/160; 526/943; 502/104; 502/113; 502/115; 502/117; 502/232; 502/152
(58) Field of Search ................................ 502/104, 113, 502/115, 117, 232, 152, 63; 526/160, 943

(56) References Cited

U.S. PATENT DOCUMENTS

| | | | |
|---|---|---|---|
| 4,808,561 A | * 2/1989 | Welborn, Jr. ................ | 502/104 |
| 5,032,562 A | * 7/1991 | Lo et al. ..................... | 502/111 |
| 5,120,696 A | * 6/1992 | Tsutsui et al. ............... | 502/113 |
| 5,461,127 A | 10/1995 | Naganuma et al. ......... | 526/127 |
| 5,527,752 A | 6/1996 | Reichle et al. | |
| 5,565,397 A | 10/1996 | Sangokoya ................. | 502/129 |
| 5,807,936 A | 9/1998 | Fritze et al. ................ | 526/126 |
| 5,928,982 A | * 7/1999 | Suga et al. ................. | 502/118 |

FOREIGN PATENT DOCUMENTS

| | | |
|---|---|---|
| EP | 0 519 746 A1 | 12/1992 |
| EP | 0 589 638 * | 3/1994 |
| EP | 0 591 756 | 4/1994 |
| EP | 0 591 756 A2 | 4/1994 |
| EP | 0 675 138 A1 | 10/1995 |
| EP | 0 739 905 A1 | 10/1996 |
| WO | WO 95/13871 | 5/1995 |
| WO | WO 96/00742 | 1/1996 |
| WO | WO 96/35729 | 11/1996 |
| WO | WO 97/31035 | 8/1997 |

OTHER PUBLICATIONS

R. Gómez et al., "Mono–η–cyclopentadienyl–benzamidinato chloro compounds of titanium, zirconium and hafnium" Journal of Organometallic Chemistry, 491:153–158 (1995).

G. Doyle et al., "Synthesis of β–diketonate Chelates of the Bis(cyclopentadienyl)titanium (IV) Moiety: Infrared and Proton Magnetic Resonance Spectra,"Inorganic Chemistry, 6(6):1111–1115 (1967).

* cited by examiner

*Primary Examiner*—David W. Wu
*Assistant Examiner*—Ling-Siu Choi
(74) *Attorney, Agent, or Firm*—Finnegan, Henderson, Farabow, Garrett and Dunner, L.L.P.

(57) ABSTRACT

A supported catalyst system suitable for the polymerization of olefins prepared by a specific preparative route comprising optionally pretreating a support followed by addition of a neutral metal complex/activator solution. The metal complex may be a metallocene in particular a complex with trifluoromethanesulfonate ligands and the activator is a Lewis acid.

12 Claims, No Drawings

SUPPORTED POLYMERIZATION CATALYST

This application is a continuation of International Application No. PCT/GB98/01961, filed Jul. 3, 1998, the content of which is incorporated herein by reference.

BACKGROUND OF THE INVENTION

The present invention relates to a novel supported polymerisation catalyst composition comprising a discrete metal complex, a support and an activator in particular an activator based on a Lewis acid, to a supported catalyst additionally comprising a Ziegler catalyst component and in particular to a method of preparing said supported catalyst.

The use of discrete metal complex based olefin polymerisation catalysts is well-known. Examples of such catalysts include metallocene complexes comprising a bis(cyclopentadienyl) zirconium complex for example bis(cyclopentadienyl) zirconium dichloride or bis(tetramethylcyclopentadienyl) zirconium dichloride disclosed in EP 129368, EP 206794, and EP 260130.

In such catalyst systems the discrete metal complex is used in the presence of a suitable activator. The activators most suitably used with such metal complexes are aluminoxanes, most suitably methyl aluminoxane or MAO. Other suitable activators are perfluorinated boron compounds.

It would however be beneficial to be able to use simpler and less costly activators with these discrete metal complexes.

WO 98/11144 describes catalyst systems based on discrete metal complexes comprising hetero-atom containing chelating ligands together with Lewis acids. Such systems have the advantage of not requiring the use of expensive aluminoxanes as activators. The aforementioned WO 98/11144 discloses that the discrete metal complexes may be supported and may also be used in the presence of Ziegler catalyst components. However there are no teachings of how such supported catalyst systems may be prepared.

We have now found that such supported catalyst systems based on discrete metal complexes which are suitable for the polymerisation of olefins and which do not require aluminoxane activators may be prepared by a specific preparative route which results in the metal complex being predominantly fixed on the support.

SUMMARY OF THE INVENTION

Thus according to the present invention there is provided a method for preparing a supported catalyst composition suitable for the polymerisation of olefins said method comprising the steps of
(a) optionally pretreating a support,
(b) preparing a mixture of a neutral discrete metal complex and activator in a suitable solvent,
(c) contacting the support with the mixture from step (b), and
(d) removing the solvent to yield a free flowing powder, wherein the metal complex of step (b) has the formula.

$$(L)_p MY_n X_m Z_q$$

where
L represents a ligand which remains attached to the metal under polymerisation conditions,
M is a Group IIIA element or Group IIIB, IVB, VB, VIB or VIII transition metal Y is halogen or a group containing at least one O, S, N or P atom bound directly to M
X may be the same as Y or different and is chosen from halogen, a group containing at least one O, S, N or P atom bound directly to M, hydrogen or hydrocarbyl
Z is a neutral Lewis base
n >or= 1
p >or= 1
m >or= 0
q >or= 0.

DETAILED DESCRIPTION OF THE INVENTION

The support may be for example organic polymer, functionalised organic polymers, polysiloxanes, functionalised polysiloxanes, ion-exchange resins and porous inorganic metal oxides and chlorides for example silica, alumina or magnesium chloride.

The preferred support is silica, in particular dehydrated silica. The inorganic metal oxides and chloride supports may be dehydrated by conventional methods for example by calcination at elevated temperatures. Water may be removed from supports that are unstable to elevated temperatures by Dean and Stark separation. The dehydrated support material may optionally be pretreated with a Group I–III metal alkyl compound for example by heating in a suitable solvent such as toluene. Particularly preferred compound are those comprising alkyl groups having >2 carbon atoms for example trisiobutylaluminium.

The supported catalyst composition according to the present invention may be subsequently treated with an alkylating agent prior to the use as a polymerisation catalyst. A suitable alkylating agent is triisobutylaluminium.

It is a particular advantage of the present invention that the catalyst is not dissolved off the support in solvents normally used in polymerisation systems eg. alkanes, aromatics. In this way the metal complex is predominantly fixed to the support.

Particularly suitable complexes of the present invention are those having the general formula:

$$(L)_p MY_n X_m Z_q$$

where
L represents an unsubstituted or substituted cyclopentadienyl ligand,
M is a Group IVB, VB, VIB or VIII transition metal
Y is halogen or a group containing at least one O, S, N or P atom bound directly to M
X may be the same as Y or different and is chosen from halogen, a group containing at least one O, S, N or P atom bound directly to M, hydrogen or hydrocarbyl
Z is a neutral Lewis base
n >or= 1
p >or= 1
m >or= 0
q >or= 0.

Suitable metal complexes include metallocene complexes comprising bis(cyclopentadienyl) complexes such as those disclosed for example in EP 129368 or EP 206794.

Also suitable for use in the present invention are complexes having constrained geometry such as those disclosed in EP 416815 or EP 420436.

For example complexes having the following general formula may be suitable:

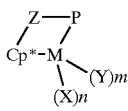

wherein:

Cp* is a single η5-cyclopentadienyl or η5-substituted cyclopentadienyl group optionally covalently bonded to M through —Z—P— and corresponding to the formula:

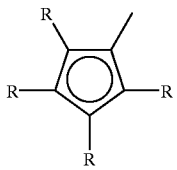

wherein

R each occurrence is hydrogen or a moiety selected from halogen, alkyl, aryl, haloalkyl, alkoxy, aryloxy, silyl groups, and combinations thereof of up to 20 non-hydrogen atoms, or two or more R groups together form a fused ring system;

M is zirconium, titanium or hafnium bound in an η5 bonding mode to the cyclopentadienyl or substituted cyclopentadienyl group and is in a valency state of +3 or +4.

X each occurrence is hydride or a moiety selected from halo, alkyl, aryl, silyl, germyl, aryloxy, alkoxy, amide, siloxy, and combinations thereof (e.g. haloalkyl, haloaryl, halosilyl, alkaryl, aralkyl, silylalkyl, aryloxyaryl, and alkyoxyalkyl, amidoalkyl, amidoaryl) having up to 20 non-hydrogen atoms, and neutral Lewis base ligands having up to 20 non-hydrogen atoms;

n and m may be 0, 1 or 2.

Z is a divalent moiety comprising oxygen, boron, or a member of Group IVA of the Periodic Table of the Elements;

P is a linking group covalently bonded to the metal comprising nitrogen, phosphorus, oxygen or sulfur, or optionally Z and P together form a fused ring system.

The Y group has the same definition as above.

Illustrative but non-limiting examples of particularly suitable metal complexes for use in the catalyst composition of the present invention are those having the following Y groups in the above general formulae:

Halide
Trifluoromethanesulfonate
Methanesulfonate
Perchlorate
Fluorosulfonate
Nitrate
Pentafluorotellurate
Toluenesulfonates including halo substituted
Benzenesulfonates including halo substituted
Alkoxides
Aryloxides
$HC(SO_2CF_3)_2$—
Oxalate and substituted oxalate
Acetate
Carboxylate
Acetylacetonate and substituted acetylacetonate
dithioacetylacetonate
Carbamate
Thiocarboxylate
Dithiocarboxylate
Thiocarbamate
Dithiocarbamate
Xanthate
Thioxanthate
Phosphinate
Thiophosphinate
Dithiophosphinate
dialkyldithiophosphate
amidinate
sulphurdiiminate
amidate
tropolonate
oxalate ester
nitrite
sulphinate
fluorosulphate
hydroxamate
thiohydroxamate
dithiohydroxamate The preferred metal complexes are those in which the Y group is trifluoromethanesulfonate and in which X is the same as Y.

Preferred complexes are those in which M is zirconium, titanium or hafnium.

Suitable activators for use in the method of the present invention are Lewis acids.

Examples of suitable Lewis acids are alkyl aluminium compounds eg trimethyl aluminium, triisobutylaluminium, aryl aluminium compounds eg tris(pentafluorophenyl) aluminium, aluminium hydrides eg aluminium trihydride and mixed hydride/arylalkyl aluminium compounds eg di-isobutyl aluminium hydride, mono(pentafluorophenyl)di-isobutylaluminium. Also suitable are dialkyl aluminium halides eg dimethyl aluminium chloride or alkyl aluminium dihalides eg methyl aluminium dichloride or ethyl aluminium dichloride.

Alkyl or aryl borons eg 1,8 naphthalenediylbis (diisobutylborane), boron halides or hydrides, macrocyclic boron compounds eg boracyclododecane, alkyl magnesiums or magnesium halides are also suitable. Particularly suitable is tris(pentafluorophenyl) boron.

Aryloxy aluminium compounds eg (2,7-dimethyl-1,8-biphenylenedioxy)bis(di-iso-butylaluminium) and aryloxy boron compounds eg catecholborane are also suitable.

Suitable solvents for use in the method of the present invention include alkanes or aromatics. A particularly suitable solvent is toluene.

The catalyst system according to the present invention may also comprise a second catalyst component in particular a Ziegler catalyst component.

Thus according to another aspect of the present invention there is provided a method for preparing a supported catalyst suitable for the polymerisation of olefins comprising:

(a) impregnating a support with a first catalyst component (A), optionally further treating with a Group I–III metal alkyl compound, (b) preparing a mixture of a second catalyst component (B) comprising a metal complex as herein before described and activator in a suitable solvent, and (c) contacting the treated support from (a) with the mixture from (b), and (d) removing the solvent to yield a free flowing powder.

The polymerisation catalyst component (A) may be a metallocene or may be a Ziegler catalyst component.

The Ziegler component of the catalyst composition of the present invention may be any Ziegler catalyst well known in the art but is preferred to be a catalyst comprising essentially atoms of titanium, magnesium and halogen.

The present invention also provides a process for the production of polyolefins, in particular homopolymers of ethylene and copolymers of ethylene with minor amounts of at least one C3 to C10, preferably C3 to C8 alpha-olefin. The process comprises contacting the monomer or monomers, optionally in the presence of hydrogen, with a catalyst composition prepared according to the method of the present invention at a temperature and pressure sufficient to initiate the polymerisation reaction.

Suitably the alpha olefin may be propylene, butene-1, hexene-1, 4-methyl pentene-1 and octene-1.

The olefin polymerisation catalyst compositions prepared according to the present invention may be used to produce polymers using solution polymerisation, slurry polymerisation or gas phase polymerisation techniques. Methods and apparatus for effecting such polymerisation reactions are well known and described in, for example, Encyclopaedia of Polymer Science and Engineering published by John Wiley and Sons, 1987, Volume 7, pages 480 to 488 and 1988, Volume 12, pages 504 to 541. The catalyst according to the present invention can be used in similar amounts and under similar conditions to known olefin polymerisation catalysts.

The supported catalyst compositions prepared according to the method of the present invention are particularly suitable for use in the gas phase.

The polymerisation may optionally be carried out in the presence of hydrogen. Hydrogen or other suitable chain transfer agents may be used to control the molecular weight of the produced polyolefin.

The present invention will now be further illustrated by reference to the following examples.

EXAMPLE 1

Preparation of Supported Catalyst

Silica (8 g, Crosfield ES70, calcined at 800° C. for 5h) was suspended in dry toluene (120 ml) and triisobutylaluminium (6 ml, 1.0M in toluene) was added. The resulting slurry was then refluxed under a nitrogen atmosphere for 3 hr. at 115–120° C. The solid was recovered by filtration and washed with dry toluene (20 ml) and dried on a vacuum line at 20° C.

A solution of tris(pentafluorophenyl)boron (50 μmol in 7.5 ml dry toluene) was added to a solution of bis(1,3-dimethylcyclopentadienyl)zirconium di(trifluoromethanesulfonate) (50 μmol in 7.5 ml dry toluene) and the mixture shaken for 2 mins. This solution was then added to 1.0 g of the pretreated support prepared as above and the solvent removed under vacuum at 20° C., to yield the catalyst as a free flowing powder.

EXAMPLE 2

Polymerisation

The supported catalyst (0.280 g) (prepared in example 2) and the treated support material (0.251 g) were injected into a stirred gas phase reactor containing dried salt (300 g) and triisobutylalumiinium (1.7 ml, 0.95M in hexane) and to which ethylene was continuously added to maintain a pressure of 8 bar. The polymerisation was carried out at 75° C. for 125 min. and 27.1 g. polyethylene was recovered.

EXAMPLE 3

Silica (Crosfield ES 70, dried at 800° C. for 5 hr. in flowing nitrogen, 20 kg.) was slurried in dry hexane (110 L) and hexamethyldisilazane (Fluka, 30 mol) added with stirring at 50° C. Dry hexane (120 L) was added with stirring, the solid allowed to settle, the supernatant liquid removed by decantation and further dry hexane (130 L) added with stirring. The hexane washing was repeated a further 3 times. Dibutylmagnesium (FMC, 30 mol) was added and stirred for 1 hr. at 50° C. tert-Butyl chloride (Huls, 60 mol) was added and stirred for 1 hr. at 50° C. To this slurry was added an equimolar mixture of titanium tetrachloride (Thann & Mulhouse, 3 mol) and titanium tetra-n-propoxide (Thann & Mulhouse, 3 mol) with stirring at 50° C. for 2 hr. followed by 5 washings with dry hexane (130 L). The slurry was dried under a flowing nitrogen stream to give a solid, silica supported Ziegler catalyst.

EXAMPLE 4

A solution of tris(pentafluorophenyl)boron (50 μmol in 7.5 ml. dry toluene) was added to a solution of bis(1,3-dimethylcyclopentadienyl)zirconium ditrifluoromethane sulfonate (50 μmol in 7.5 ml. dry toluene) and the mixture shaken for 2 mins. This solution was then added to 1.0 g. of the silica supported Ziegler catalyst prepared in example 3 and the solvent removed under vacuum at 20° C., to yield the catalyst as a free flowing powder.

EXAMPLE 5

Polymerisation

A 3 litre reactor equipped with a helical stirrer was heated to 95° C. for 1.5 hr. under flowing nitrogen. The temperature was reduced to 45° C. and dry sodium chloride (300 g) was then added with trimethylaluminium (TMA) solution (2 ml of 2M TMA in hexane) and the reactor heated at 85° C. for 2 hr. The reactor was purged with nitrogen, cooled to 45° C. and trisobutylaluminium (TiBA) solution (10 ml of 0.14M TiBA in hexane) added. The temperature was raised to 75° C. and hydrogen (0.06 bar) and 1-hexene (1.2 ml) added prior to the addition of ethylene (8.0 bar). Reaction was started by injection of the metallocene modified Ziegler catalyst (0.21 g) and TiBA/silica scavenger* (0.13 g) into the reactor. The temperature was maintained at 75° C. and ethylene added to maintain constant pressure. The gas phase was monitored by mass spectrometer and hydrogen and 1-hexene were added as necessary to maintain constant gas phase concentrations. The polymerisation was carried out for 90 min. and 97 g of polyethylene with a polydispersity of 6.4 was recovered.

Scavenger material*

Silica (8 g, Crosfield ES70, calcined at 800° C. for 5 hr) was suspended in dry toluene (120 ml) and triisobutylaluminium (6 ml, 1.0M in toluene) was added. The resultant slurry was then refluxed under a nitrogen atmosphere for 3 hr. at 115–120° C. The solid was recovered by filtration and washed with dry toluene (20 ml) and dried on a vacuum line at 20° C.

I claim:

1. A method for preparing a supported catalyst composition for the polymerisation of olefins comprising the steps of:

(a) providing a support of silica,
(b) optionally pretreating the support,
(c) preparing a mixture of a neutral discrete metal complex and a Lewis acid other than an aluminoxane as an activator in a solvent for the metal complex,
(d) contacting the support with the mixture from step (c), and
(e) removing the solvent to yield a free flowing powder, wherein the metal complex of step (c) has the formula:

$$(L)_pMY_nX_mZ_q$$

where

L represents a ligand which remains attached to the metal under polymerisation conditions, M is a Group IIIA element or Group IIIB, IVB, VB, VIB or VIII transition metal Y is trifluoromethanesulfonate X may be the same as Y or different and is chosen from a halogen, a group containing at least one O, S, N or P atom bound directly to M, hydrogen or a hydrocarbyl Z is a neutral Lewis base n>or=1 p>or=1 m>or=0 q>or=0.

2. A method according to claim 1 wherein the complex has the general formula:

$$(L)_pMY_nX_mZ_q$$

where

L represents an unsubstituted or substituted cyclopentadienyl ligand,

M is a Group IVB, VB, VIB or VIII transition metal

Y is trifluoromethanesulfonate

X may be the same as Y or different and is chosen from a halogen, a group containing at least one O, S, N or P atom bound directly to M, hydrogen or a hydrocarbyl Z is a neutral Lewis base n>or=1 p>or=1 m>or=0 q>or=0.

3. A method according to claim 1 wherein

X=Y and M is zirconium.

4. A method according to claim 1 wherein the support is pretreated with a Group I–III metal alkyl.

5. A method according to claim 1 wherein the Lewis acid is tris(pentafluorophenyl)boron.

6. A method for preparing a supported catalyst for the polymerisation of olefins comprising:

(a) providing silica as a support, (b) impregnating the support with a first catalyst component (A), optionally further treating the support with a Group I–IIII metal alkyl compound, (c) preparing a mixture of a second catalyst component (B) comprising a neutral discrete metal complex and a Lewis acid other than an aluminoxane as an activator in a solvent for the metal complex, (d) contacting the treated support from (b) with the mixture from (c), and (e) removing the solvent to yield a free flowing powder, wherein the metal complex of step (c) has the formula:

$$(L)_pMY_nX_mZ_q$$

where

L represents a ligand which remains attached to the metal under polymerisation conditions, M is a Group IIIA element or Group IIIB, IVB, VB, VIB or VIII transition metal Y is trifluoromethanesulfonate X may be the same as Y or different and is chosen from a halogen, a group containing at least one O, S, N or P atom bound directly to M, hydrogen or a hydrocarbyl Z is a neutral Lewis base n>or=1 p>or=1 m>or=0 q>or=0.

7. A method according to claim 6 wherein the first catalyst component (A) is a Ziegler catalyst.

8. A method according to claim 7 wherein the Ziegler catalyst comprises essentially the atoms of titanium, magnesium, or halogen.

9. A method according to claim 6 wherein the complex has the general formula:

$$(L)_pMY_nX_mZ_q$$

where

L represents an unsubstituted or substituted cyclopentadienyl ligand,

M is a Group IVB, VB, VIB or VIII transition metal

Y is trifluoromethanesulfonate

X may be the same as Y or different and is chosen from a halogen, a group containing at least one O, S, N or P atom bound directly to M, hydrogen or a hydrocarbyl Z is a neutral Lewis base n>or=1 p>or=1 m>or=0 q>or=0.

10. A method according to claim 6 wherein

X=Y and M is zirconium.

11. A method according to claim 6 wherein the support is pretreated with a Group I–III metal alkyl.

12. A method according to claim 6 wherein the Lewis acid is tris(pentafluorophenyl)boron.

* * * * *